US008612458B2

(12) United States Patent
Christenson et al.

(10) Patent No.: US 8,612,458 B2
(45) Date of Patent: Dec. 17, 2013

(54) CATALOG MANAGEMENT MODULE IN A CUSTOM PRODUCT CONFIGURATION SYSTEM

(75) Inventors: Chad Christenson, North Mankato, MN (US); Craig Christiansen, North Mankato, MN (US); Dave Griebenow, North Mankato, MN (US); Jim Roettger, Mankato, MN (US)

(73) Assignee: Presentation Specialist Technologies, LLC, Tyler, TX (US)

( * ) Notice: Subject to any disclaimer, the term of this patent is extended or adjusted under 35 U.S.C. 154(b) by 119 days.

(21) Appl. No.: 13/101,831

(22) Filed: May 5, 2011

(65) Prior Publication Data

US 2011/0208618 A1    Aug. 25, 2011

Related U.S. Application Data

(62) Division of application No. 10/888,070, filed on Jul. 9, 2004, now abandoned.

(60) Provisional application No. 60/485,778, filed on Jul. 9, 2003.

(51) Int. Cl.
*G06F 7/00* (2006.01)

(52) U.S. Cl.
USPC .................................................. 707/754

(58) Field of Classification Search
USPC .................................................. 707/754
See application file for complete search history.

(56) References Cited

U.S. PATENT DOCUMENTS

| 6,360,216 B1 | 3/2002 | Hennessey et al. |
| 6,810,401 B1 | 10/2004 | Thompson et al. |
| 2002/0059395 A1* | 5/2002 | Liou ............................. 709/217 |
| 2002/0087408 A1 | 7/2002 | Burnett |
| 2003/0018513 A1 | 1/2003 | Hoffman et al. |
| 2003/0172051 A1 | 9/2003 | Ouchi |

* cited by examiner

*Primary Examiner* — Robert Beausoliel, Jr.
*Assistant Examiner* — Nirav K Khakhar
(74) *Attorney, Agent, or Firm* — Fahmi, Sellers, Embert & Davitz

(57) ABSTRACT

A software system may be used to define configurable products for use in a selling application module by sellers of products to define custom configuration of products to satisfy customer needs. During periodic points in time, a subset of all configuration of these configurable products may be offered for sale by sellers user special price terms and conditions. Catalogs of sale products may provide a mechanism for configuring only products that are included within sale products. A catalog manager module may assist in preparing a catalog of product data and related configuration rules associated with only products included within a particular catalog.

6 Claims, 8 Drawing Sheets

CATALOG MANAGEMENT MODULE IN A CUSTOM PRODUCT CONFIGURATION SYSTEM

This application is a Divisional of U.S. application Ser. No. 10/888,070 filed Jul. 9, 2004, now abandoned entitled "CATALOG MANAGEMENT MODULE IN A CUSTOM PRODUCT CONFIGURATION SYSTEM", which claims the benefit of U.S. Provisional Application No. 60/485,778, entitled "CATALOG MANAGEMENT SYSTEM," filed Jul. 9, 2003, the entire content of which is incorporated herein by reference.

TECHNICAL FIELD

The invention relates to product configuration and sales systems.

BACKGROUND

Software based product configuration and sales systems provide sellers an automated tool to assist in the configuration of custom products from a large set of components, options and features that are available for the customizable products. Product configuration tools typically utilize product data constructed from a hierarchical set of product-option-attributes listings as well as a set of configuration rules that define how products may be customized. The configuration rules typically constrain a set of available product options given selected options already specified in defining a product.

The product data utilized in these product configuration and sales systems typically contain all products and all related options available for use when products are defined. This product data and related software may be provided to a large number of product sellers for use in their respective sales efforts. Since not all sellers offer all available products, products with all available options and option attributes, the product configuration systems may suffer performance penalties associated with use of these tools as large amounts of product data are used when only a smaller subset is of interest to a seller at any given point in time.

The product data and related configuration rules are typically specified in a specific and typically complicated format that is needed to permit specification of products having a plurality of product options, each of which may have a set of individual product option attributes. All of this product data must also be specified in terms of the associated configuration rules used to limit configuration choices as desired. This complicated product data and configuration rule specification and modification process typically prevents easy and quick modification of product data for use as sales offerings vary over time. Additional, the complicated product data and configuration rule specification and modification process typically requires a highly trained operator possessing an understanding of the complicated product data and configuration rules as well as their interaction to modify product data. Thus the development of complicated product data and corresponding configuration rules may be an expensive and time consuming process that does not lend itself to rapid modifications needed to support a rapidly changing sales environment that may be customized for individual sellers, individual customers and particular sales time periods.

SUMMARY

In general, the invention is directed to a software system for defining configurable products for use in a selling application module by sellers of products to define custom configuration of products to satisfy customer needs. During periodic points in time, a subset of all variants of these configurable products may be offered for sale by sellers under special price terms and conditions. Catalogs of sale products may provide a mechanism for configuring only products that are included within sale products. A catalog manager module may assist in preparing a catalog of product data and related configuration rules associated with only products included within a particular catalog.

In one embodiment, the invention is directed to computer implemented method for defining a catalog of customizable products. A method presents a product list containing an option-option attribute tree to a user, accepts user selection commands selecting items from a hierarchical option-option attribute tree for inclusion within a catalog product data database. For each item selected, the method identifies and applies all configuration rules related to all items lower in the hierarchical option-option attribute tree to ensure inclusion of all necessary items and only permitted items within the hierarchical option-option attribute tree, and extracts product data and configuration rules associated with all selected items within the hierarchical option-option attribute tree to generate the catalog product data database. The option-option attribute tree comprises a hierarchical data structure corresponding to definition of configurable products.

In another embodiment, the invention is directed to a catalog manager module having a product-component selection module and a product-component rules module. The product-component selection module accepts user selection commands selecting items from a hierarchical option-option attribute tree for inclusion within a catalog product data database. The product-component rules module identifies and applies all configuration rules for each item selected that are related to all items lower in the hierarchical option-option attribute tree to ensure inclusion of all necessary items and only permitted items within the hierarchical option-option attribute tree.

In another embodiment, the invention is directed to a computer-readable medium containing instructions. The instructions cause a programmable processor to present a product list containing an option-option attribute tree to a user, accept user selection commands selecting items from a hierarchical option-option attribute tree for inclusion within a catalog product data database, for each item selected, identify and apply all configuration rules related to all items lower in the hierarchical option-option attribute tree to ensure inclusion of all necessary items and only permitted items within the hierarchical option-option attribute tree, and extract product data and configuration rules associated with all selected items within the hierarchical option-option attribute tree to generate the catalog product data database, modify customizable product attributes associated with products selected within the option-option attribute tree. The option-option attribute tree comprises a hierarchical data structure corresponding to definition of configurable products.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
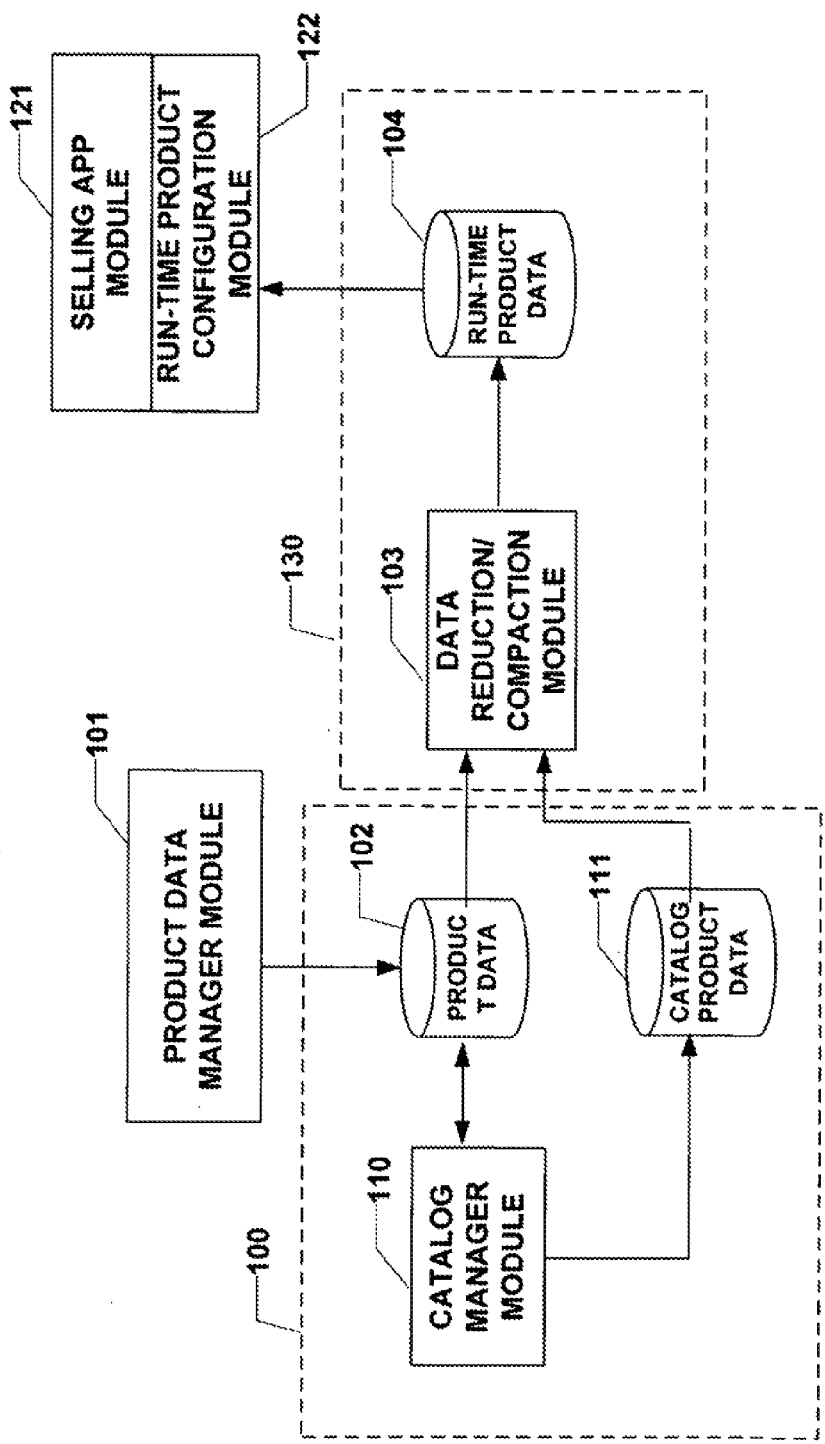
FIG. 1 is a block diagram illustrating catalog management processing system within a custom product configuration processing system according to an embodiment of the present invention.

FIG. 1 is a block diagram illustrating catalog management processing system within a custom product configuration processing system according to an embodiment of the present invention. Catalog management system 100, includes a catalog manger module 110, product data database 102, and catalog product data database 111, processes product data contained within product data database 102 to generate a smaller catalog product data database 111 for use in a selling application module 121 and related run-time product configuration module 122. Catalog product data database 111 contains product configuration data and related configuration rules used to hierarchically define a set of configurable products.

Catalog manager module 110 permits users to specify a subset of all available product data 102 to be used to define a smaller catalog product data database 111. This catalog product data database 111 typically includes a subset of all of the available products that are to be offered for sale by a product seller. This catalog product data database 111 may represent a subset of products related to only products sold by the seller. This catalog product data database 111 may represent a subset of products related to only products sold to a particular customer. This catalog product data database 111 may represent a subset of products related to only products during a specific period of time. These subsets of products represent a set of configurable products contained within a specific "catalog" used in the sales process.

Product data and related configuration rules found within product data database 110 are specified using product data manager module 101. Product data manager module 101 permits the hierarchical definition of products in which products are made up of a set of options where the options may possess a plurality of option attributes. Configuration rules contained within product data database 110 define relationships between products, options and option attributes that are used to constrain selection of specific options and specific option attributes when one or more options and/or option attributes have been selected.

For example, automobiles are one class of products that are typically configurable for sale to individual customers. For any given automobile, a set of options may include a first set of engines and a second set of transmissions that are available for use in defining the automobile. Within the product data database 110, the specific automobile may be considered a product. The options available for selection may include among a number of options an engine option and a transmission option. The engine option attributes therefore would include a listing of available engines that may be used to configure the automobile. Similarly, the transmission option attributes therefore would include a listing of available transmissions that may be used to configure the automobile. Configuration rules related to the automobile product may specify that if a particular engine is selected during configuration of a customer's automobile, selection of a particular 8-cylindar engine for example, that only automatic transmissions may be used. If the transmission option attributes included a manual transmission for a version of the automobile, the configuration rule prohibits selection of the manual transmission. The configuration rules may also require selection of some options, such as engine and transmission, but not require selection of other options, such as audio systems and air conditioning.

Users interact with product data manager module 101 to define the products, their options, their option attributes, and the related configuration rules each time a new product is defined for sale and each time an existing product is modified. Product data manager module 101 ultimately generates product data database 102 that is stored within a processing system for use by other modules within the overall system. As example embodiment of product data manager module 101 and an example embodiment of product data database 102 may be found in commonly assigned U.S. Pat. No. 6,141,658 entitled "COMPUTER SYSTEM AND METHOD FOR MANAGING SALES INFORMATION," and U.S. Pat. No. 6,438,547 entitled "COMPUTER READABLE DATA PRODUCT FOR MANAGING SALES INFORMATION," both of which are incorporated herein by reference.

Product data and related configuration rules found within product data database 110 and within catalog product database 111 may be further processed within a run-time data reduction module 130 that uses a data reduction/compaction module 103 to generated a run-time product data database 104. Run-time product data database 104 contains a reduced set of product data and configuration rules that is optimized for use by run-time product configuration module 122 and related selling application module 121. This data reduction of product data removes any non-essential data from the product data database to permit operation of the selling application module 121 execute in a reduced time and use less memory in a processing system. The data reduction may include translation of data maintained in human-readable form to a computer-only readable form. In alternate embodiments, runtime data reduction module 130 may be omitted with selling application module 121 using product data database 102 and catalog product data database 111 directly.

Once the product data databases are prepared, sellers may use selling application module 121 together with run-time configuration module 122 to define a configurable product on behalf of a customer based upon data unique to each individual customer. As such, customers may obtain products configured to meet individual customer requirements. Examples of processing systems that include selling application module 1212 and run-time configuration module 122 are described in commonly assigned U.S. Pat. No. 5,493,490, entitled "ELECTRONIC PROPOSAL PREPARATION SYSTEM FOR SELLING VEHICLES;" U.S. Pat. No. 5,615,342, entitled "ELECTRONIC PROPOSAL PREPARATION SYSTEM;" U.S. Pat. No. 5,625,776, entitled "ELECTRONIC PROPOSAL PREPARATION SYSTEM FOR SELLING COMPUTER EQUIPMENT AND COPY MACHINES;" U.S. Pat. No. 5,283,865, entitled "COMPUTER ASSISTED PARTS SALES SYSTEM;" and U.S. Pat. No. 5,283,865, entitled "COMPUTER ASSISTED PARTS SALES METHOD," All of these U.S. patents are hereby incorporated by reference herein in their entirety.

Figure 2:
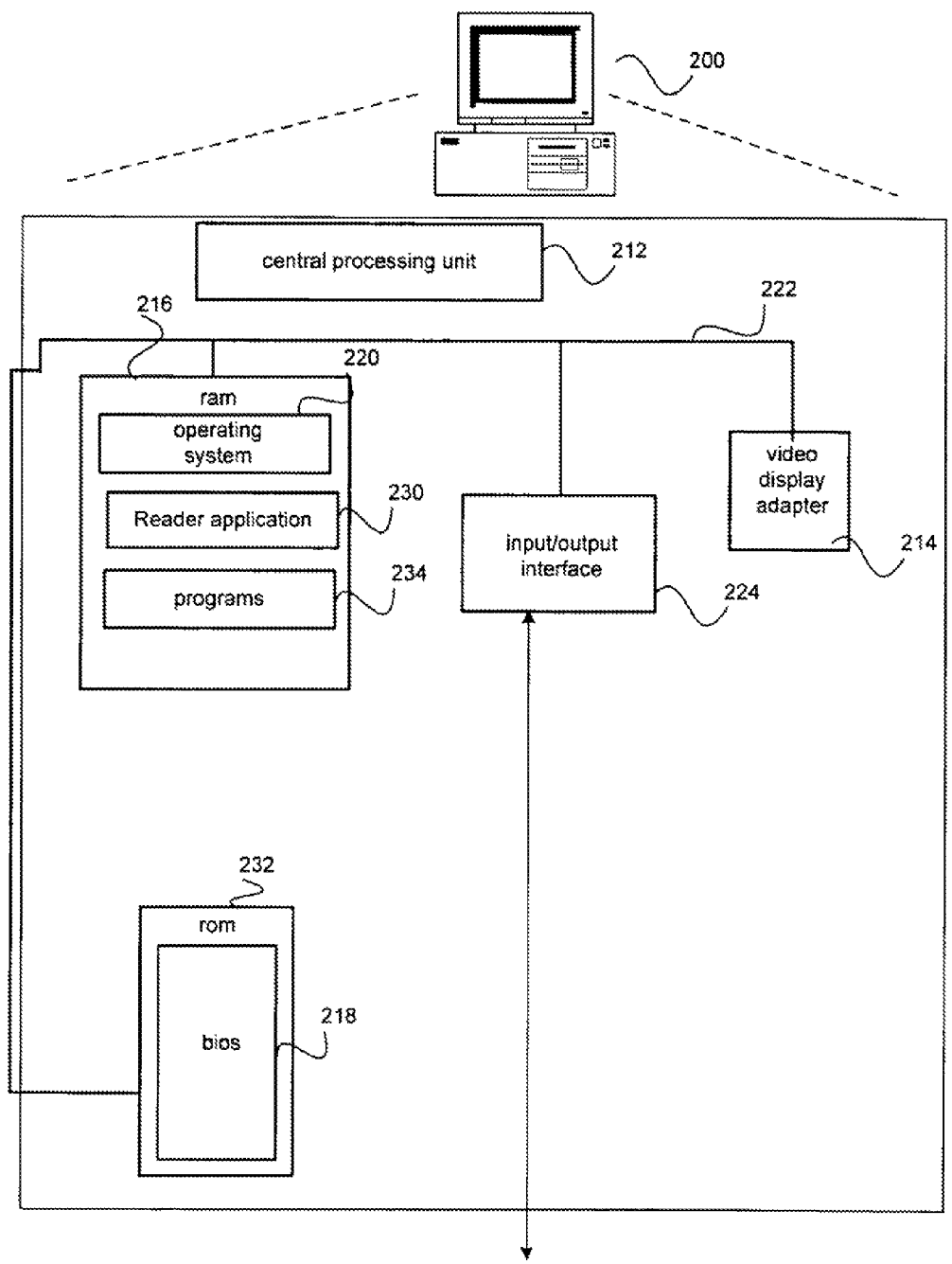
FIG. 2 is a block diagram illustrating a general programmable processing system for use in catalog management processing system in accordance with an example embodiment of the present invention.

FIG. 2 is a block diagram illustrating a general programmable processing system for use in a catalog management processing system in accordance with an example embodiment of the present invention. In an exemplary embodiment of a processing system 200, computing system 200 is operative to provide a catalog management processing system. Those of ordinary skill in the art will appreciate that the catalog management processing system 200 may include many more components than those shown with reference to a computing system 200 shown in FIG. 2. However, the components shown are sufficient to disclose an illustrative embodiment for practicing the present invention.

As shown in FIG. 2, catalog management processing system 200 is used in connection with run-time product configuration module 122 and selling application module 121 as needed. The catalog management processing system 200 also includes processing unit 212, video display adapter 214, and a mass memory, all connected via bus 222. The mass memory generally includes RAM 216, ROM 232, and may include one or more mass storage devices, such as a removable memory device such as a Compact Flash, Smart Media, or Secure Digital memory card. The memory devices may store an operating system 220 for controlling the operation of catalog management processing system 200. It will be appreciated that this component may comprise a general purpose server operating system as is known to those of ordinary skill in the art, such as UNIX, MAC OS™, LINUX™, or Microsoft WINDOWS®. Basic input/output system ("BIOS") 218 is also provided for controlling the low-level operation of processing system 200.

The mass memory as described above illustrates another type of computer-readable media, namely computer storage media. Computer storage media may include volatile and nonvolatile, removable and non-removable media implemented in any method or technology for storage of information, such as computer readable instructions, data structures, program modules or other data. The mass memory also stores program code and data for providing a software development and catalog management processing system. More specifically, the mass memory stores applications including catalog manager program 230, and other programs 234, and similar analysis tool applications as may be needed. The catalog management processing program 230 includes computer executable instructions which are executed to perform the logic described herein.

The catalog management processing system 200 also comprises input/output interface 224 for communicating with external devices, such as a touch screen and similar input devices, or other input devices not shown in FIG. 2. Likewise, the catalog management processing system 200 may further comprise additional mass storage facilities (not shown) should additional data storage be needed.

One skilled in the art will recognize that the processing system illustrated within FIG. 2 may represent a set of processing components typically found within back-office dedicated processing system. Of course, other processing systems including general purpose computing systems containing additional peripherals and user interface devices may also be used to implement the programmable processing according to various embodiments of the present invention without deviating from the spirit and scope of the present invention as recited within the attached claims. For example, a dedicated processing system may consist of a digital signal processor (DSP) for performing the required floating-point math, various internal memory types including FLASH, ROM, RAM, and FPGA, some minimal external memory, and a user interface and display driver chip to run the switches and custom LCD display. A proprietary embedded operating system is and a specifically written application for implementing the indicator tool program may be included.

FIG. 2 illustrates an example of a suitable operating environment in which the invention may be implemented. The operating environment is only one example of a suitable operating environment and is not intended to suggest any limitation as to the scope of use or functionality of the invention. Other well known computing systems, environments, and/or configurations that may be suitable for use with the invention include, but are not limited to, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The invention may also be described in the general context of computer-executable instructions, such as program modules, executed by one or more computers or other devices. Generally, program modules include routines, programs, objects, components, data structures, etc. that perform particular tasks or implement particular abstract data types. Typically the functionality of the program modules may be combined or distributed as desired in various embodiments.

Processing devices typically includes at least some form of computer readable media. Computer readable media can be any available media that can be accessed by these devices. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by processing devices.

Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

Additionally, the embodiments described herein are implemented as logical operations performed by a programmable processing device. The logical operations of these various embodiments of the present invention are implemented (1) as a sequence of computer implemented steps or program modules running on a computing system and/or (2) as interconnected machine modules or hardware logic within the computing system. The implementation is a matter of choice dependent on the performance requirements of the computing system implementing the invention. Accordingly, the logical operations making up the embodiments of the invention described herein can be variously referred to as operations, steps, or modules.

Figure 3:
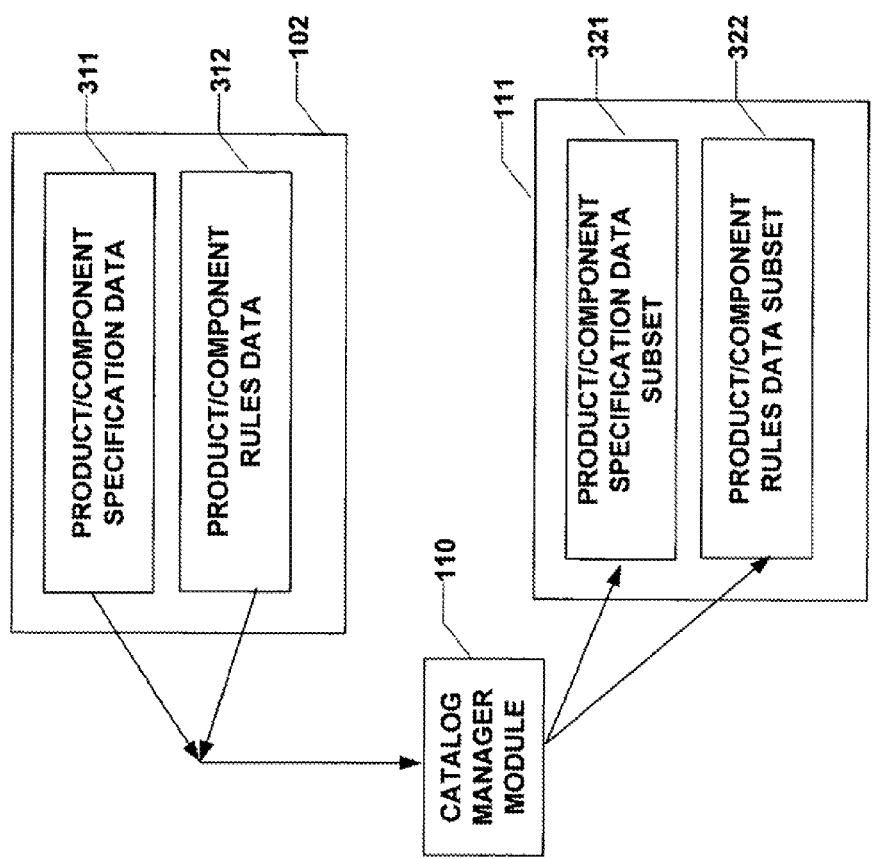
FIG. 3 is a block diagram illustrating a catalog manager processing module interactions with product custom product data and rules database in accordance with an example embodiment of the present invention.

FIG. 3 is a block diagram illustrating a catalog manager processing module interactions with product custom product data and rules database in accordance with an example embodiment of the present invention. Catalog manager module 110 retrieves product/component specification data 311 and product/component rules data 312 in response to user interaction with catalog manager module 110 to generate product/component specification data subset 321 and product/component rules subset data 322 satisfying requirements from the user. During the user's interaction with catalog manager 110, selected products, selected components from selected products, and selected component attributes for selected products and selected product components are specified by a user for inclusion within catalog product data database 111. Catalog manager module 110 stores the product data specified by the user within product/component specification subset data 321. Catalog manager module 110 also retrieves all configuration rules from within product/component rules data 312 relevant to selected product data and stores the retrieved rules within product/component rules data subset 322. This product selection process occurs interactively as users select products of interest until all products, product options and product option attributes have been specified.

Catalog product data database 111 may be completed once a user makes any modifications to product data within the catalog product data database. For example, product data may include attributes associated with product price and product discounts used by selling application module 121 to determine a price for configured products. For a particular catalog, prices for particular products and related discounts or markups given when determining a price for a configured product may be changed as part of a sale of products that are to be supported by a particular catalog product data database 111. Catalog manager module 110 may include valid date range and a valid region within a particular catalog product data database 111 to specify when the modified product data contained within the particular catalog product data database may be used. Sales of products in which reduced or marked up prices are offered may be limited in time and/or limited in geographic region. The inclusion of this additional catalog use limitations within the particular catalog product data database 111 permits selling application module 121 to use the particular catalog product data database when the limitations specified in these values are met. Other limitations of this type may include identity of a particular customer and/or a division of particular customer when a catalog is tailored for use by one particular customer that configures products for its particular uses. Other such limitations may also be included for use by selling application module 121 without departing from the present invention.

Figure 4:
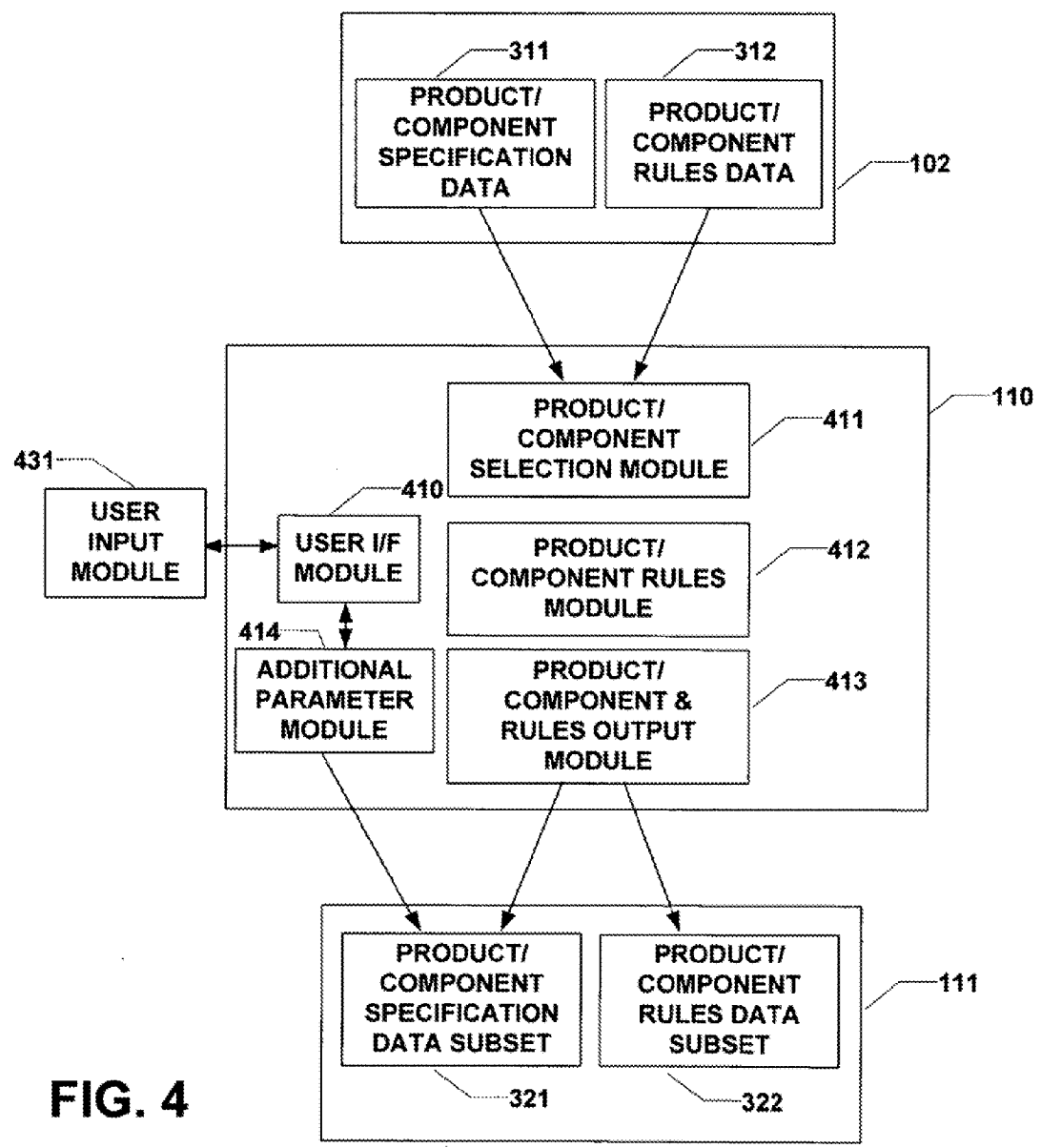
FIG. 4 is a diagram illustrating a detailed catalog manager processing module of FIG. 3 in accordance with an example embodiment of the present invention.

FIG. 4 is a diagram illustrating a detailed catalog manager processing module of FIG. 3 in accordance with an example embodiment of the present invention. Catalog manager module 110 comprises a set of processing modules used to generate catalog product data database 111 from product data database 102 based upon input received from user module 431. These processing modules include user interface (I/F) module 410, product/component selection module 411, product component rules module 412, product component and rules output module 413, and additional parameters module 414. Users specify products, product options, and product option attributes through user input module 431 that are found within product data database 102 for inclusion into catalog product data database 111. User input is processed within user I/F module 410 to command the other modules to perform tasks associated with selecting product data and corresponding rules for inclusion within catalog product data database 111.

Product/component selection module 411 receives commands from user I/F module 410 to retrieve product data from product data database 102 for presentation to a user through user I/F module 410 and user input module 431. Users select products from the presented product data that are desired for inclusion in catalog product data database 111. When a product, product option or product attribute is selected, product/component selection module 411 retrieves the necessary product data corresponding to the selected item from product/component specification data 311. When a product is selected, all of its hierarchically associated product options and product option attributes are also included in the data retrieved. Users then select and de-select product options from the list of options available for the selected product. When an option is selected, its corresponding data is included in product/component specification data subset 321. When a previously selected product option is de-selected, its corresponding product data is removed from product/component specification data subset 321. Users interactively specify products and their specifications to be included within catalog product data database 111.

Product component rules module 412 retrieves configuration rules from product/component rules data 312 that correspond to products, product options and product option attributes selected by a user. These retrieved configuration rules are stored within product/component rules data subset 322. Product component rules module 412 may retrieve relevant rules each time a product, product option or product option attribute is selected by a user and insert them into product/component rules data subset 322. Product component rules module 412 may remove relevant rules from product/component rules data subset 322 each time a product, product option or product option attribute is de-selected by a user. In alternate embodiments, product component rules module 412 may retrieve relevant configuration rules once a user has selected all products, product options and product option attributes without departing from the present invention.

Product component and rules output module 413 receives product data from product/component selection module 411 and stores the data within catalog product data database 111 in an appropriate format. Similarly, product component and rules output module 413 receives configuration rules from product/component rules module 412 and stores the rules within catalog product data database 111 in an appropriate format.

Additional parameters module 414 permits users to modify attributes within catalog product data database 111 to create a custom catalog of products and corresponding prices for use with this particular catalog product data database 111. Other parameter module 411 retrieves product data and its corresponding modifiable attributes from catalog product data database 111 and presents them to a user through user I/F module 410 and user input module 431. Modifications to the attributes received from a user are then stored back into catalog product data database 111 through product component and rules output module 413. This process continues until a user is satisfied with a catalog definition. Additional parameter module 414 also accepts other limiting attributes such as a valid date range and valid region for use of the catalog product data database 111 that are also inserted in the catalog product data database for use by selling application module 121.

Figure 5:
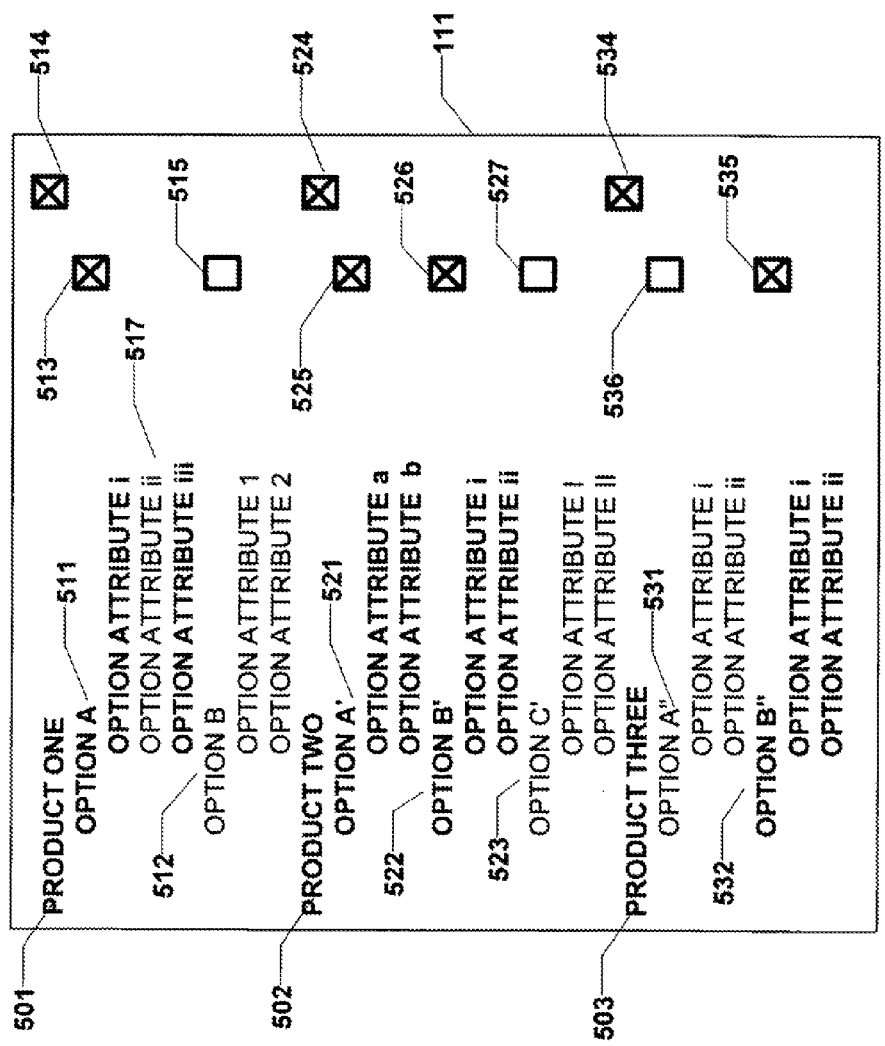
FIG. 5 is a diagram illustrating a set of products having components and related options for use within a catalog manager processing module in accordance with the present invention.

FIG. 5 is a diagram illustrating a set of products having components and related options for used within a catalog manager processing module in accordance with the present invention. When a user interactively defines a set of product data and corresponding configuration rules for use in a particular catalog product data database 111, the user may be presented a set of products and related options for selection. In this particular embodiment, three products are shown: product one 502, product two 502, and product three 503. These three products may represent three of a plurality of products a user may select for use in a catalog.

In this embodiment, a user selects a particular product using a checkbox to indicate selection of each product. Product one 501 is selected when checkbox 514 is checked. Product two 502 is selected when checkbox 524 is checked. Product three 503 is selected when checkbox 534 is checked. Of course, other user input control mechanisms such as radio buttons, pop-up menus and similar user interface controls may be used in place of checkboxes without departing from the present invention.

Product one 501 is shown to contain two options: option A 511 and option B 512. Each of these options contain multiple options for specifying option attributes associated with the corresponding options. Similarly, Product two 502 is shown to contain three options: option A' 521, option B' 522 and option C' 523. Product three 503 is shown to contain two options: option A" 531 and option B" 532.

Each of these options are selected using a corresponding checkbox. Checkbox 513 selects option A 511 and checkbox 515 selects option B 512. Similarly, checkbox 525 selects option A' 521, checkbox 526 selects option B' 522 and checkbox 527 selects option C' 523. Checkbox 536 selects option A" 531 and checkbox 535 selects option B" 532. When a particular checkbox is checked, the corresponding option is selected and its corresponding items shown in FIG. 5 shown using BOLD text, or some similar visual indication the items are selected. For example, checkbox 536 is checked and checkbox 536 is not checked to indicate product three 503 may include only option B" 532 and not option A" 531 in the particular catalog product data database 111. Options and option attributes corresponding to selected option B" 532 are shown in bold where options and option attributes corresponding to unselected option A" 531 are shown in plain text. Similar selection is shown for product one 501 and product two 502.

Within selected option A 511 of product one 501, option attribute ii 517 is shown in plain text rather than bold text to indicate that option attribute ii 517 is not selected. The option attribute may be selected and de-selected using a checkbox (not shown) or similar user input controls as discussed above. A user may interactively specify the plurality of products, their desired options and corresponding option attributes that are to be included when catalog product data database 111 is generated.

As noted above, configuration rules within product data database 102 may be used to limit combinations of options and option attributes when one or more options or option attributes are selected. For example, product two 502 includes option A' 521. A configuration rule may specify that if option A' 521 is selected, option B' 522 must also be selected. When a user selects option A' 521, option B' 522 will also be selected as catalog manager module 110 enforces configuration rules associated with product two 502 when option A' 521, option B' 522 and option C' 523 are selected and de-selected. As such, combinations of products, product options and product option attributes selected by a user will automatically conform to the configuration rules used within selling application module 121. The use of bold text or similar visual indications provide users with feedback relating to possible combination of options and option attributes.

Figure 6:
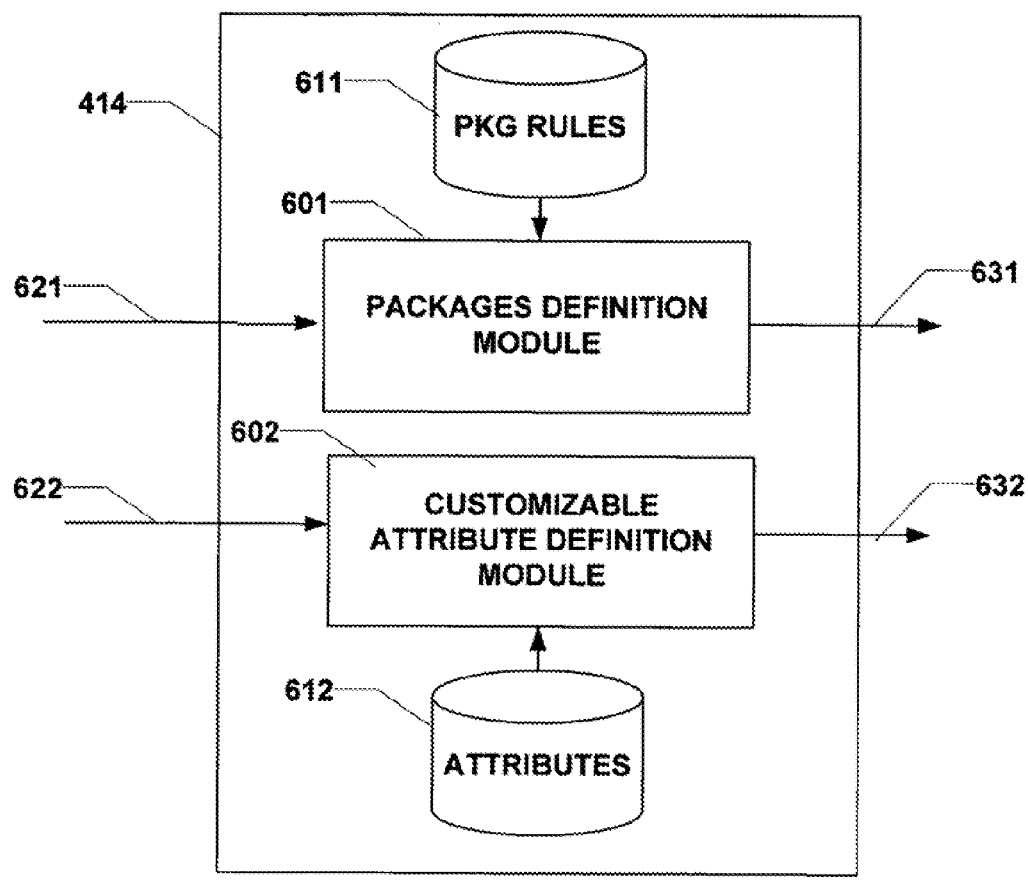
FIG. 6 is a block diagram of an additional parameters processing module for used within a catalog manager processing module in accordance the present invention.

FIG. 6 is a block diagram of an additional parameters processing module for used within a catalog manager processing module in accordance the present invention. As discussed in reference to FIG. 4, additional parameters module 414 permits users to modify various option attributes for products, product options and related items as well as put restrictions into a catalog product data database 111. Additional parameter module 414 includes a packages definition module 601 and a customizable attribute definition module 602. Customizable attribute definition module 602 performs the attribute modification described in reference to FIG. 4. Customizable attribute definition module 602 uses attribute database 612 to identify which product attributes within a product data database 102 may be modified, such as price, discount, delivery dates etc. Customizable attribute definition module 602 receives commands 621 from user I/F module 410 to define the modification of the attributes that is requested. Customizable attribute definition module 602 processes these commands 621 and generates the modified attribute data 632 sent to catalog product data database 111.

Packages definition module 601 permits use of predefined packages of products for inclusion in a catalog product data database 111. Periodic sales of products may always include one subset of products, product options, and option attributes at one time of the year and a different subset of products, product options, and option attributes at a different time of the year. Package rules database 611 may contain predefined packages of these subsets of products as well as other configuration rules that may be used when defining a subset of products to be included within a particular catalog. Packages definition module 601 receives commands 621 from user I/F module 410 to define the packages of products, product options and option attributes that is requested. Packages definition module 601 processes these commands 621 and generates package attribute data 631 sent to catalog product data database 111.

Figure 7:
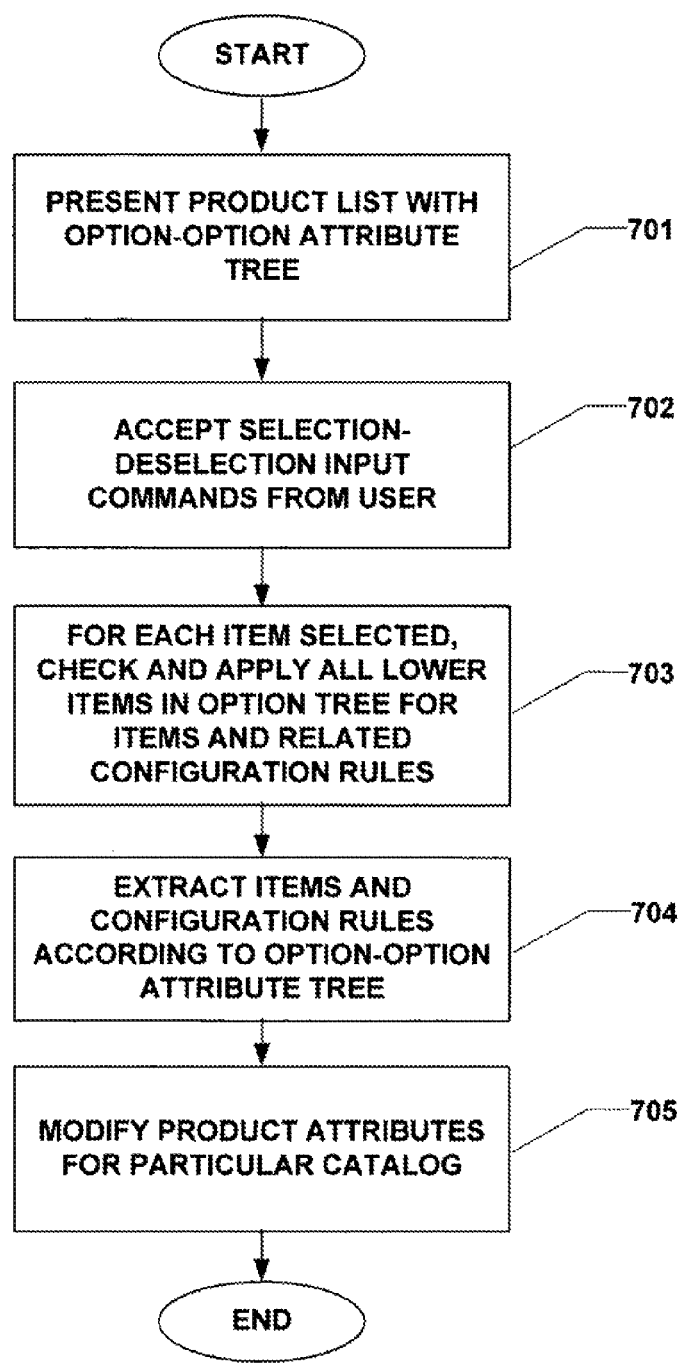
FIG. 7 is a flowchart illustrating a sequence of operation performed by a catalog manager processing module in accordance with an example embodiment of the present invention.

FIG. 7 is a flowchart illustrating a sequence of operation performed by a catalog manager module in accordance with an example embodiment of the present invention. When a user creates a catalog of configurable products for use by selling application module 121, the user selects a set of products, product options and product option attributes for use in defining products in the catalog. The processing begins when a list of products are presented to the user in the form of an option-option attribute tree (701). The option-option attribute tree consists of a hierarchical representation of a set of products; the products defined in terms of a set of options having various option attributes. Each product, option, and option attribute represents an item within the option-option attribute tree.

The user specifies which product, product option and product option attribute is to be included within the catalog by selecting the option-option attribute tree item corresponding to the items desired. Using a user input module 431, users provide commands to catalog manager module 110 to provide these item selections (702). When a particular item is selected within the option-option attribute tree, the selected item and all lower items within the option-option attribute tree are checked to determine any configuration rules within product data database 102 relevant to these items (703). All identified configuration rules are applied to the option-option attribute tree to select and de-select any other item within the tree according to elements of the configuration rules.

Once the user selects all products, product options and option attributes by selecting the corresponding tree items, all selected items and corresponding configuration rules are extracted from product data database 102 to generate catalog product data database 111 (704). Users may then modify any product attributes permitted for the products included within catalog product data database 111 to complete the catalog database (705). The catalog product data database 111 is now ready for use in generating run-time product data 104 for use in selling application module 121 and related run-time product configuration module 122.

Figure 8:
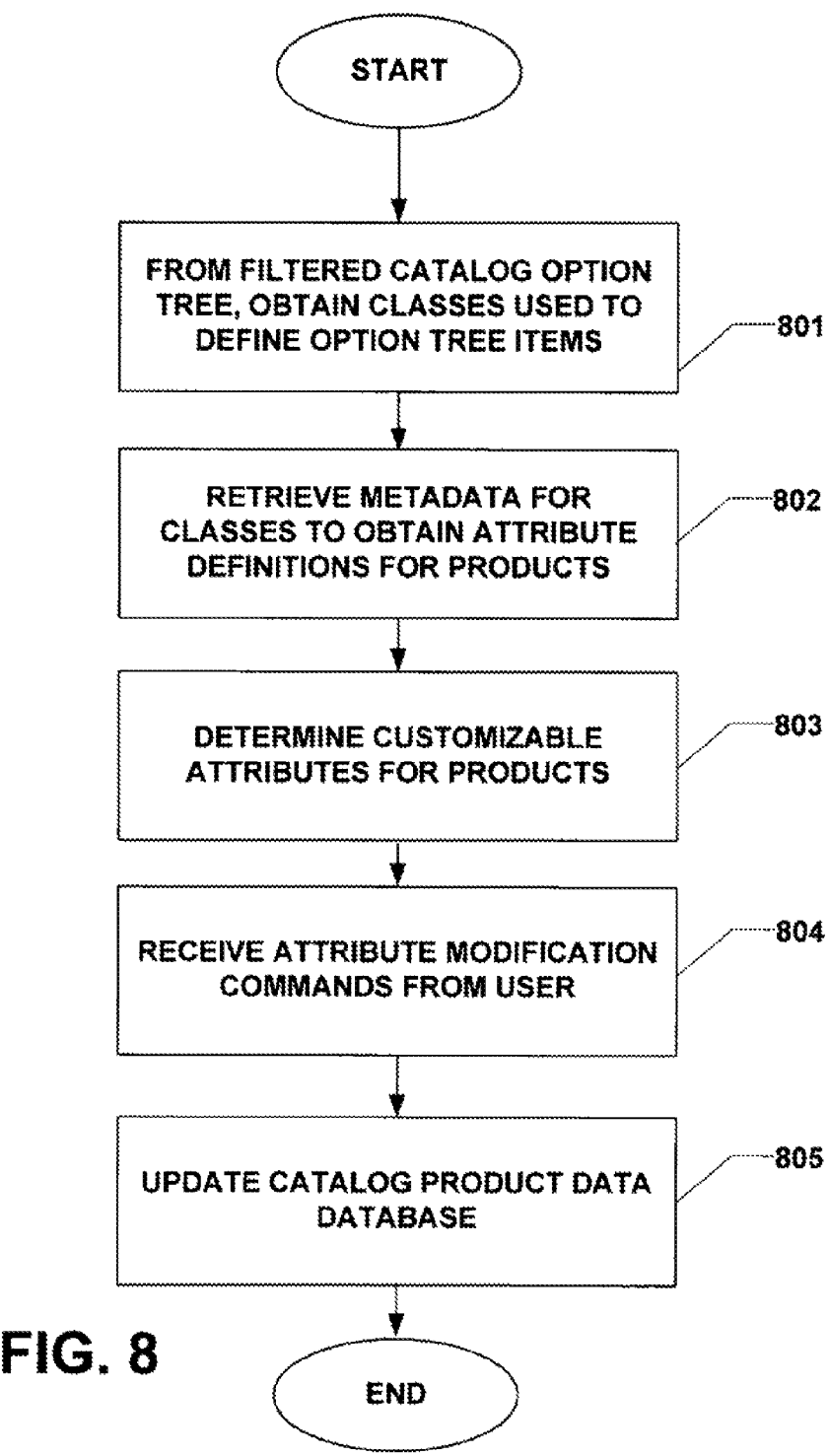
FIG. 8 is a flowchart illustrating a sequence of operation performed by a catalog manager module to modify product attributes in accordance with an example embodiment of the present invention.

FIG. 8 is a flowchart illustrating a sequence of operation performed by a catalog manager module to modify product attributes in accordance with an example embodiment of the present invention. Users may modify a set of customizable product attributes for any product selected for inclusion within a catalog product data database 111. Once a subset of products, their options and related option attributes are defined using a user defined catalog option-option attribute tree, additional parameter module 414 obtains classes used within product data database 102 to define products and their related items (801). These classes are software items used within processing modules to define products in terms of the product options, option attributes, configuration rules, and customizable product attributes. Metadata associated with these classes contains the data used to define the products. The metadata for the obtained classes is retrieved (802) and then used to identify all customizable attributes for the products in catalog product data database 111 (803).

The identity of all customizable attributes is provided to users to permit generation of commands by user input module 431 specify how any of the customizable attributes are to be modified (804). When additional parameter module 414 receives these commands, attribute data within catalog product data database 111 is updated to reflect the requested modifications. Users may modify any customizable attributes present in the catalog product data database 111 to define a catalog or product data. The catalog product data database 111 is now ready for use in generating run-time product data 104 for used in selling application module 121 and related run-time product configuration module 122.

Various embodiments of the invention have been described.

These and other embodiments are within the scope of the following claims.

The invention claimed is:

1. A method comprising:
providing, by a catalog management system, access to data regarding a plurality of available products to a user, wherein the data is stored in a product database communicatively coupled to the catalog management system and is divided into a plurality of subsets;
receiving, by the catalog management system, a selection of a subset from the user, extracting data included in the selected subset from the product database by the catalog management system, and transmitting, by the catalog management system, the extracted data to a runtime data reduction module communicatively coupled to the catalog management system;
generating, by the runtime data reduction module, a catalog including only the extracted data, wherein the generated catalog includes respective ones of the available products included in the selected subset, hierarchically associated product options and product option attributes for the respective ones of the available products, and product configuration rules associated with the respective ones of the available products; and
providing the generated catalog to the user via a user application module communicatively coupled to the runtime data reduction module.

2. The method of claim 1, further comprising:
configuring, by the runtime data reduction module, the respective ones of the available products within the generated catalog such that it is optimized for a particular user application module.

3. The method of claim 1, further comprising:
storing, by the runtime data reduction module, the generated catalog in a catalog database communicatively coupled to the runtime data reduction module; and
enabling, by the runtime data reduction module, the user to access the generated catalog in the catalog database via the user application module.

4. The method of claim 1, further comprising:
receiving, at the runtime data reduction module, user information via the user application module;
defining, by the runtime data reduction module, a configurable product based on the received user information and configuration rules associated with the configured product; and
providing, by the runtime data reduction module, access to the definition to the user via the user application module.

5. A computer system comprising:
a product database configured to store data regarding a plurality of available products, wherein the data is divided into a plurality of subsets;
a catalog management system comprising a processor and a memory coupled to the processor, the catalog management system communicatively coupled to the product database and configured to provide access to the data stored in the product database to a user, receive a selection of a subset from the user, extract data included in the selected subset from the product database, and transmit the extracted data to a runtime data reduction module;
the runtime data reduction module communicatively coupled to the catalog management system and configured to receive the extracted data from the catalog management system, generate a catalog including the extracted data, hierarchically associated product options and product option attributes for respective ones of the available products included in the selected subset, and product configuration rules associated with the respective ones of the available products, and transmit the generated catalog to a user application module; and
the user application module communicatively coupled to the runtime data reduction module and configured to receive the generated catalog from the runtime data reduction module and provide the generated catalog to the user.

6. A non-transitory computer-readable media including a set of instructions which when executed by a computer system cause the computer system to:
provide access to data regarding a plurality of available products stored in a product database to a user, wherein the data is divided into a plurality of subsets;
receive a selection of a subset from a user;
extract data included in the selected subset from the product database;
generate a catalog including the extracted data, respective ones of the available products included in the selected subset, hierarchically associated product options and product option attributes for the respective ones of the available products, and product configuration rules associated with the respective ones of the available products; and provide the generated catalog to the user.

* * * * *